(12) United States Patent
Kim (10) Patent No.: US 8,950,431 B2
(45) Date of Patent: Feb. 10, 2015

(54) FLUID FLOW CONTROL DEVICE

(75) Inventor: Young Bum Kim, Seoul (KR)

(73) Assignee: System D&D Co., Ltd., Daejeon (KR)

( * ) Notice: Subject to any disclaimer, the term of this patent is extended or adjusted under 35 U.S.C. 154(b) by 292 days.

(21) Appl. No.: 13/518,991

(22) PCT Filed: Mar. 26, 2010

(86) PCT No.: PCT/KR2010/001847
§ 371 (c)(1),
(2), (4) Date: Jun. 25, 2012

(87) PCT Pub. No.: WO2011/118863
PCT Pub. Date: Sep. 29, 2011

(65) Prior Publication Data
US 2012/0273065 A1    Nov. 1, 2012

(51) Int. Cl.
*F16K 3/32* (2006.01)
*F16K 47/08* (2006.01)

(52) U.S. Cl.
CPC ................................... *F16K 47/08* (2013.01)
USPC .................................................. 137/625.33

(58) Field of Classification Search
USPC ............................. 137/625.33–625.39
See application file for complete search history.

(56) References Cited

U.S. PATENT DOCUMENTS

| | | | |
|---|---|---|---|
| 2,002,717 A * | 5/1935 | Robart et al. | 137/505 |
| 3,722,854 A * | 3/1973 | Parola | 251/127 |
| 3,813,079 A * | 5/1974 | Baumann et al. | 251/127 |
| 3,917,221 A * | 11/1975 | Kubota et al. | 251/127 |
| 3,921,668 A * | 11/1975 | Self | 137/625.3 |
| 3,954,124 A * | 5/1976 | Self | 138/42 |
| 4,567,915 A * | 2/1986 | Bates et al. | 138/42 |
| 4,671,321 A * | 6/1987 | Paetzel et al. | 137/625.3 |
| 4,860,993 A * | 8/1989 | Goode | 251/127 |
| 4,921,014 A | 5/1990 | Tartaglia et al. | |
| 5,018,703 A | 5/1991 | Goode | |
| 6,394,134 B1 | 5/2002 | Kwon | |
| 6,505,646 B1 * | 1/2003 | Singleton | 137/625.3 |
| 6,766,826 B2 | 7/2004 | Baumann | |
| 8,033,300 B2 * | 10/2011 | McCarty | 138/42 |

FOREIGN PATENT DOCUMENTS

| | | |
|---|---|---|
| JP | 11-022856 A | 1/1999 |
| JP | 11-248033 A | 9/1999 |
| KR | 10-1988-0000320 B1 | 3/1988 |
| KR | 10-0280893 B1 | 11/2001 |
| KR | 10-0527918 B1 | 11/2005 |
| KR | 10-2008-0062280 A | 7/2008 |

* cited by examiner

*Primary Examiner* — John Fox
(74) *Attorney, Agent, or Firm* — Rabin & Berdo, P.C.

(57) ABSTRACT

Disclosed therein is a fluid flow control device having a cylinder assembly, which includes cylinders overlapped with each other and fluid pathways for controlling flow rate and velocity of fluid, comprising: a first cylinder having a plurality of first fluid pathways of an elongated form horizontally permeating the cylinder from a central axis; a second cylinder disposed on the outer circumference of the first cylinder; and a third cylinder disposed on an outer circumference of the second cylinder.

10 Claims, 11 Drawing Sheets

FLUID FLOW CONTROL DEVICE

TECHNICAL FIELD

The present invention relates to a fluid flow control device, and more particularly, to a fluid flow control device comprising a cylinder assembly, which is capable of preventing side effects, such as noise, vibration and cavitation, which may be caused by fluid, and precisely controlling fluid by converting the fluid into a proper kinetic energy under high differential pressure conditions and in limited usable volumes.

BACKGROUND ART

In general, a fluid flow control device is mounted in a fluid regulator, such as valves, in order to properly control kinetic energy of fluid flowing therethrough. Ultimately, the fluid flow control device is to control pressure, velocity, flow rate, noise, cavitation, and so on of the fluid into a proper level. The kinetic energy of the fluid is determined according to the flowing velocity of the fluid. Furthermore, the flowing velocity of the fluid is directly associated with a local loss (local fluid resistance) determined by a pressure difference (differential pressure) of the fluid acting between an inlet and an outlet of the fluid flow control device, density of the fluid, forms of fluid pathways, and the Reynolds number.

In other words, the flowing velocity of the fluid in the fluid flow control device is in inverse proportion to the square root of a loss coefficient of a fluid resistance part under a specific differential pressure condition applied to the device or the fluid resistance part, and the kinetic energy of the fluid is proportional to the square of the flowing velocity. Thus, in order to lower the kinetic energy of the fluid into a proper level, the loss coefficient of the fluid resistance part must be increased. Based on the theory of fluid dynamics, the flowing velocity (V), the kinetic energy (KE) and the flow rate (w) will be expressed as follows.

$$V = \frac{w}{\rho_0 A_0} \quad \text{[Mathematical formula 1]}$$

$$KE = \frac{1}{2}\rho_0 V^2 \quad \text{[Mathematical formula 2]}$$

$$V = \left(\frac{2\Delta P}{\rho_0 \zeta}\right)^{\frac{1}{2}} \quad \text{[Mathematical formula 3]}$$

Wherein, $\Delta P$ means a differential pressure acting to the device or the fluid resistance part, $\rho_0$ means density of the fluid, $A_0$ means a cross-sectional area, $\zeta$ means a loss coefficient of the fluid resistance part, and V means the flowing velocity of the fluid.

Finally, in order to lower the kinetic energy of the fluid acting to the fluid flow control device under the specific differential pressure condition, the total local fluid resistance must be increased. Moreover, in order to increase a flow rate of the fluid in a state where the kinetic energy of the fluid is controlled properly, the total sectional area of the flow path must be increased. Through the above-mentioned properties, it is possible to make the fluid flow control device small-sized.

In the meantime, if the kinetic energy of an outlet of the fluid flow control device is less than 480 kPa (corresponding to 30 m/s of water) under general flowing conditions, there are few side effects of noise, vibration and Flow-Accelerated Corrosion by the fluid. However, if the kinetic energy is more than 1,030 kPa, it may cause severe damages on the fluid flow control device and apparatuses on which the fluid flow control device is mounted. Particularly, under conditions that cavitation may be caused or under conditions of two-phase fluid, the kinetic energy must be limited to 275 kPa (corresponding to 23 m/s of water) or less. Additionally, in case of systems sensitive to vibration, it is suggested that the kinetic energy must be limited to 75 kPa (corresponding to 12 m/s of water) or less.

Furthermore, the fluid flow control device must also give consideration of noise, and in this case, the primary noise source is aerodynamic noise. The level of noise energy is related with a mass flow rate, a pressure ratio of the absolute pressure of the upstream side to the absolute pressure of the downstream side, a geometrical structure, and physical properties of fluid. Because an increase of the pressure ratio at a specific area causes a sound velocity flow or a choke flow, which is a high noise source, the pressure ratio must be controlled to thereby reduce or prevent the incidence of noise.

Accordingly, it is necessary to keep a proper flowing velocity by keeping the kinetic energy of fluid to the standard level or below and preventing a sudden change in pressure of the fluid. Various prior arts to satisfy the need have been disclosed. Particularly, various kinds of fluid flow control devices based on a cylinder shape, as shown in the present invention have been disclosed. Such fluid flow control devices can be divided by a method of changing the size of cross-sectional areas of fluid pathways and a method of suddenly changing directions of the fluid pathways.

In relation with the method of changing the size of cross-sectional areas of the fluid pathways, there are U.S. Pat. No. 4,921,014 registered on May 1, 1990, U.S. Pat. No. 5,018,703 registered on May 28, 1991, Korean Patent No. 0280893 registered on Nov. 13, 2000, U.S. Pat. No. 6,394,134 B1 registered on May 28, 2002, and U.S. Pat. No. 6,766,826 B registered on Jul. 27, 2004.

A fluid flow control device disclosed in Korean Patent No. 0280893 and U.S. Pat. No. 6,394,134 B1 will be described as below. The fluid flow control device includes: an inside cylinder having a plurality of holes and protrusions formed uniformly in axial and radial directions; an outside cylinder having a plurality of holes formed uniformly in axial and radial directions; and first internal cylinders being overlapped and inserted between the inside and outside cylinders and forming a plurality of holes on a plurality of grooves forming rectangular section elbows in the axial direction. Moreover, the fluid flow control device further includes a cage having second internal cylinders which have a plurality of holes formed uniformly in axial and radial directions and combines between the first internal cylinders, and disk-like upper and lower supporting plates for coupling the inside and outside cylinders with the first and second internal cylinders. Thus, a flowing path of the fluid is divided by the axial direction, and each fluid path has grooves forming an orifice, a rectangular section elbow and a recess so as to control a flow of the fluid. However, the invention according to prior art adopts a method of causing a sudden change of a flow path cross-sectional area, such as the orifice, at a portion where a local loss is induced. Thus, it locally causes an increase of flow velocity of the fluid and a sudden change of pressure, and hence, it may cause noise, vibration, Flow-Accelerated Corrosion, and so on and deteriorate performance of the device due to foreign substances stuck on a portion that the cross-sectional area becomes narrowed.

In U.S. Pat. No. 6,766,826 B2, a cage which is a fluid flow control device includes one or more windows and one valve seat. Additionally, each of the one or more windows includes a plurality of slots each having a longitudinal axis. The longitudinal axis of each of the slots is parallel to or tilted at a relatively small angle with respect to a reference plane that is perpendicular to a cage bore axis. The slots are tapered in width through the wall of said cage, and preferably, increase in width with increasing radius through the wall of said cage. In case that the slots are applied for control of liquid, the slots accelerate the flow when the liquid flowing direction is oriented toward the cage bore axis to thereby reach the highest velocity at the inner surface of the cylinder. This may cause the static pressure at that point to reach the vapor pressure of the liquid and consequently force partial vaporization of the jets. This vapor then collapses into liquid flow within cage bore. The invention of prior art decreases noise, but since the pressure ratio of the upstream pressure of the slots to the downstream pressure of the slots is excessive, noise is still generated under specific driving conditions. Furthermore, since the prior art artificially generates cavitation by accelerating the kinetic energy of the fluid, noise and vibration are caused under the specific driving conditions, and thus, it may cause cavitation damage in the device and adjacent structures.

As an example of the method of suddenly changing the direction of the fluid pathway, there is Korean Patent No. 0436634. In Korean Patent No. 0436634, the fluid flow control device includes a plurality of communication holes independently disposed in a cage embedded in a valve body chamber mounted between a fluid inlet and a fluid outlet, and pathways in which the communication holes are respectively refracted inside a cylindrical surface forming the same axis as an axis of the cage. Furthermore, the cage is constructed in such a way that a plurality of cylindrical bodies respectively having refraction holes on the surface thereof are bonded to thereby provide great refraction to the fluid pathways, whereby the cage can effectively absorb energies of high pressure fluid and reduce noise or cavitation. However, each cylinder must have small round through-holes formed on inner and outer surfaces thereof and refraction holes or through holes formed along the circumferential surface thereof, which are communicatingly connected. Thus, in consideration of a restricted volume of the cage, a flow rate of the fluid is reduced. Accordingly, in order to control the kinetic energy and the flow rate of the fluid to a proper level, the size of the device is relatively increased, and hence, an occupation space of the device is also increased and it costs a great deal.

Moreover, in Korean Patent No. 0527918, which has been invented by the same inventor as the present invention, diagonal fluid pathways formed in a horizontal direction are all inclined at the same angle and in the same direction. In this case, when the fluid flows from the outside to the inside of the fluid flow control device, vortex occurs inside the fluid flow control device, and it causes non-uniform flowing and pressure distribution. Thus, it may cause cavitation, flashing or hammering.

DISCLOSURE

Technical Problem

Accordingly, the present invention has been made in an effort to solve the above-mentioned problems occurring in the prior arts, and it is an object of the present invention to provide a fluid flow control device comprising a cylinder assembly, which is capable of preventing side effects, such as noise, vibration and cavitation, which may be caused by fluid, and precisely controlling fluid by converting the fluid into a proper kinetic energy under high differential pressure conditions and in limited usable volumes.

Technical Solution

To achieve the above objects, the present invention provides a fluid flow control device having a cylinder assembly, which includes cylinder-like cylinders overlapped with each other and fluid pathways for controlling flow rate and velocity of fluid, the fluid flow control device comprising: a first cylinder having a plurality of first fluid pathways of an elongated form horizontally permeating the cylinder from a central axis of the cylinder, the first fluid pathways being horizontally and longitudinally formed along an outer circumference of the cylinder, the horizontally formed fluid pathways being inclined symmetrically to each other; a second cylinder disposed on the outer circumference of the first cylinder, the second cylinder having second fluid pathways formed in correspondence with the first fluid pathways and communicating with the first fluid pathways, the longitudinal width of the second fluid pathways being larger than that of the first fluid pathways; and a third cylinder disposed on an outer circumference of the second cylinder, the third cylinder having third fluid pathways formed in correspondence with the second fluid pathways, the third fluid pathways having the same size as the first fluid pathways and being formed in such a way as to be dislocated from the first fluid pathways.

In this instance, the first to third fluid pathways are inclined at an angle of between approximately 20 degrees and approximately 40 degrees from the ground.

Furthermore, the longitudinally formed first to third fluid pathways are formed in such a way that a side of a lower end of each upper fluid pathway is overlapped with a side of an upper end of each lower fluid pathway on the same line where ends of the fluid pathways vertically adjacent to each other are parallel to the ground, such that a continuous flow rate is formed when opening of a plug inscribing with the fluid flow control device is changed.

Moreover, the longitudinally formed first to third fluid pathways have inclination angles gradually decreasing upwardly from the lower portions thereof.

Additionally, the longitudinally formed first to third fluid pathways have longitudinal heights gradually increasing upwardly from the lower portions thereof.

In addition, the first to third fluid pathways are respectively formed in the lower portions of the first to third cylinders and window-shaped through holes are formed in approximately central portions of the cylinders in such a way as to penetrate the cylinders.

Furthermore, the through holes are formed in plural number, and the diameter of the plural through holes is gradually increased upwardly from the lower portions thereof.

Moreover, the third fluid pathways are relatively higher than the first fluid pathways.

In addition, the height of the first fluid pathways, the thickness of the second cylinder and the height of the third fluid pathways are increased in sequential order.

Additionally, the cylinders respectively having the same fluid pathways as the cylinders are repeatedly and successively formed in order of the first cylinder, the second cylinder, the third cylinder, the second cylinder and the first cylinder.

Advantageous Effects

According to the present invention, since the fluid flow control device is manufactured in such a way that the fluid pathways are formed along the circumferential surfaces of the cylinders and the cylinders having the fluid pathways are overlapped in order, it can be manufactured more easily and inexpensively than the prior arts.

Furthermore, a side of a lower end of each upper fluid pathway is overlapped with a side of an upper end of each lower fluid pathway on the same line where ends of the fluid pathways vertically adjacent to each other are parallel to the ground, such that a continuous flow rate is formed when opening of the plug inscribing with the fluid flow control device is changed.

Moreover, since there are no cross-sectional changes of the upstream side and the downstream side at the fluid resistance area of each fluid pathway, an excessive pressure ratio, which may be a noise source, is not formed.

Additionally, since there is no sudden reduction of the cross-section area in the whole zone of the fluid pathway, introduced materials can be discharged to the outside without stopping in the fluid pathway.

Furthermore, since a local fluid resistance is increased through a repeatedly sudden change of the fluid pathway direction and a multi-stage and multi-path flow, which has a larger cross-sectional area than the prior arts by utilizing the circumferential surface of the cylinders is formed, the present invention can increase the flow rate of the fluid within the uniform volume of the device. Thus, the present invention can easily control the flowing of the fluid even under extra high pressure or high differential pressure conditions, prevent the damage due to noise, vibration, Flow-Accelerated Corrosion, and so on, and make the device small-sized.

Moreover, the horizontally adjacent fluid pathways out of the fluid pathways formed in the cylinders are inclined in such a way as to face each other, whereby the present invention can prevent the turbulence phenomenon of the fluid, local cavitation, flashing, hammering, and so on.

Additionally, in case of gas, the present invention regulates the height of the fluid pathways and the thickness of the cylinders in order to increase the volume of the fluid pathways to thereby effectively accept a volume increase due to the spread of the fluid, whereby the present invention can effectively reduce velocity and pressure of gas.

DESCRIPTION OF DRAWINGS

The above and other objects, features and advantages of the present invention will be apparent from the following detailed description of the preferred embodiments of the invention in conjunction with the accompanying drawings for understanding of technical ideas of the present invention, and hence, the present invention will not be restricted to the drawings.

EXPLANATION OF ESSENTIAL REFERENCE NUMERALS IN DRAWINGS

10: inlet
20: outlet
30: stem
40: plug
100: fluid flow control device
110: first cylinder
111: fluid pathway
120: second cylinder
121: second fluid pathway
130: third cylinder
131: third fluid pathway
140: fourth cylinder
141: fourth fluid pathway
150: fifth cylinder
151: fifth fluid pathway
160: sixth cylinder
161: sixth fluid pathway
170: seventh cylinder
171: seventh fluid pathway
200: through hole

MODE FOR INVENTION

Reference will be now made in detail to the preferred embodiment of the present invention with reference to the attached drawings.

Figure 1:
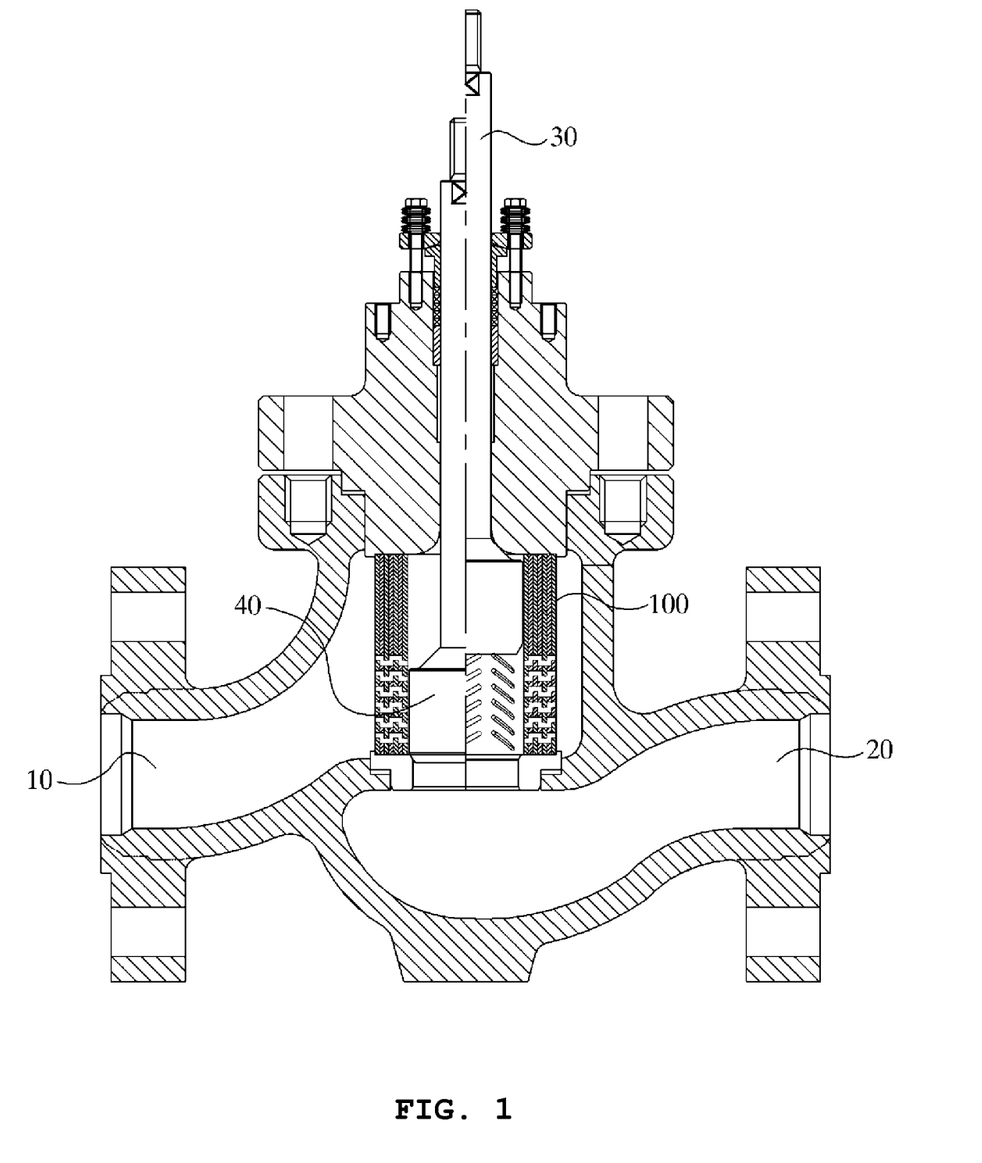
FIG. 1 is a longitudinally sectional view of a fluid flow control device of the present invention, which is mounted in a valve.

FIG. 1 is a longitudinally sectional view of a fluid flow control device of the present invention, which is mounted in a valve. The fluid flow control device 100 according to the present invention can be applied to any fluid regulator. As shown in FIG. 1, the fluid flow control device 100 is mounted between an inlet 10 and an outlet 20 within a valve, which is one of various fluid regulators. In the meantime, directions of the inlet 10 and the outlet 20 within the valve are varied according to characteristics of the valve and kinds of fluid to be used. Furthermore, the valve regulates a flow rate according to an up-and-down motion of a plug 40 operatively connected by a stem 30. That is, while a fluid pathway is opened to increase the flow rate when the plug 40 moves upwardly as shown in the right side from the central line of FIG. 1, the fluid pathway is closed to decrease the flow rate when the plug 40 moves downwardly as shown in the left side from the central line of FIG. 1.

Embodiment 1

Figure 2:
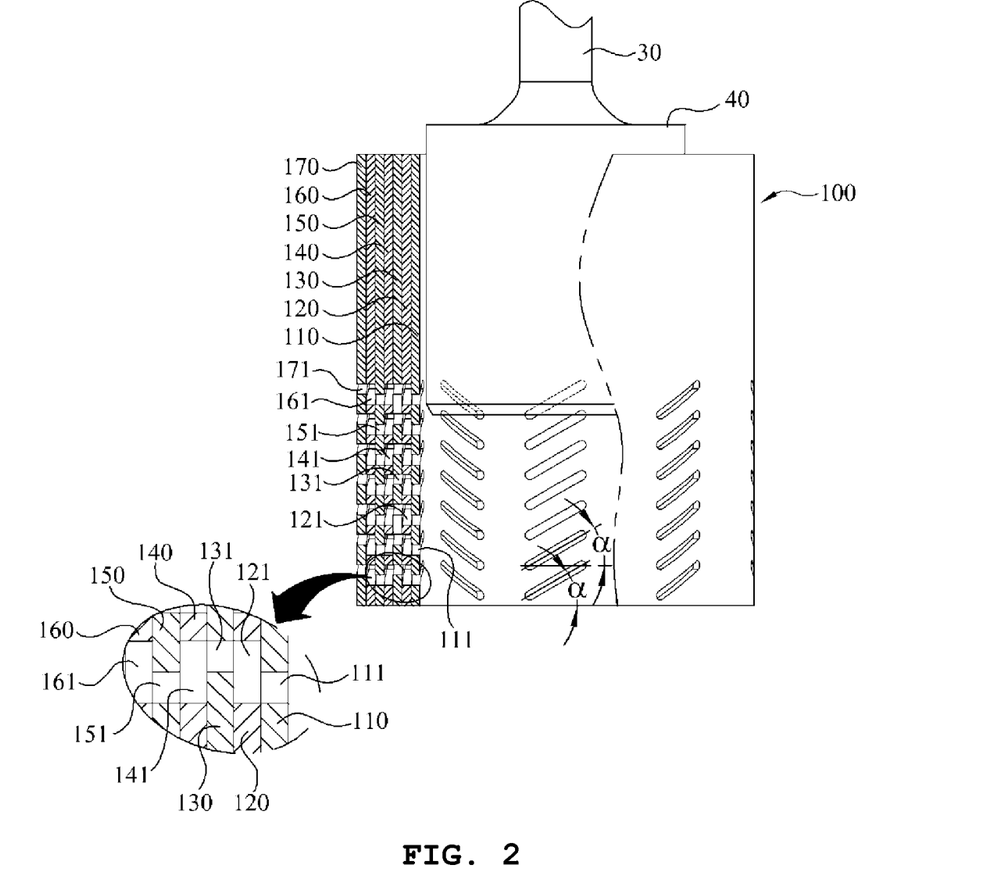
FIG. 2 is a partially sectional view of a fluid flow control device according to a first preferred embodiment of the present invention.
Figure 3:
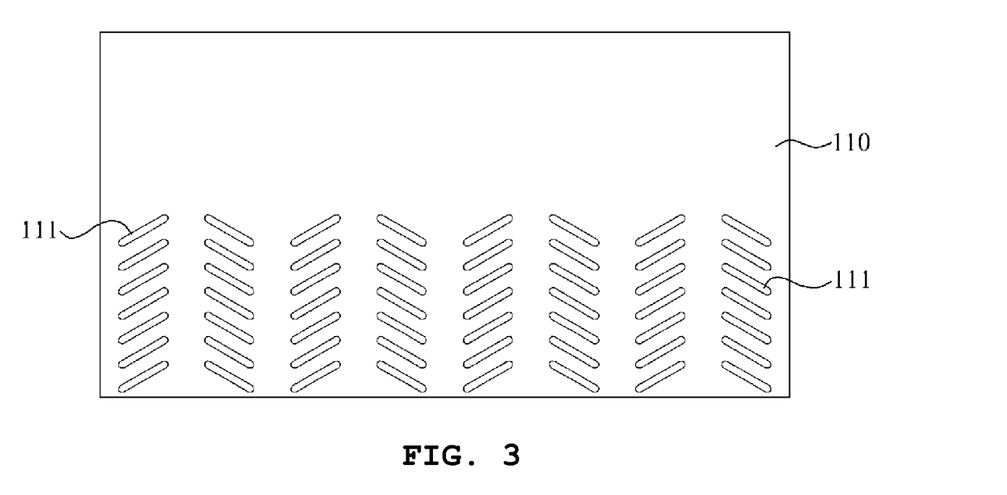
FIG. 3 is a development view of a cylinder according to the first preferred embodiment.

FIG. 2 is a partially sectional view of a fluid flow control device according to a first embodiment of the present invention, and FIG. 3 is a development view of a cylinder according to the first embodiment. The fluid flow control device 100 according to the first preferred embodiment of the present invention basically includes three cylinders of a first cylinder 110, a second cylinder 120, and a third cylinder 130.

Figure 5:
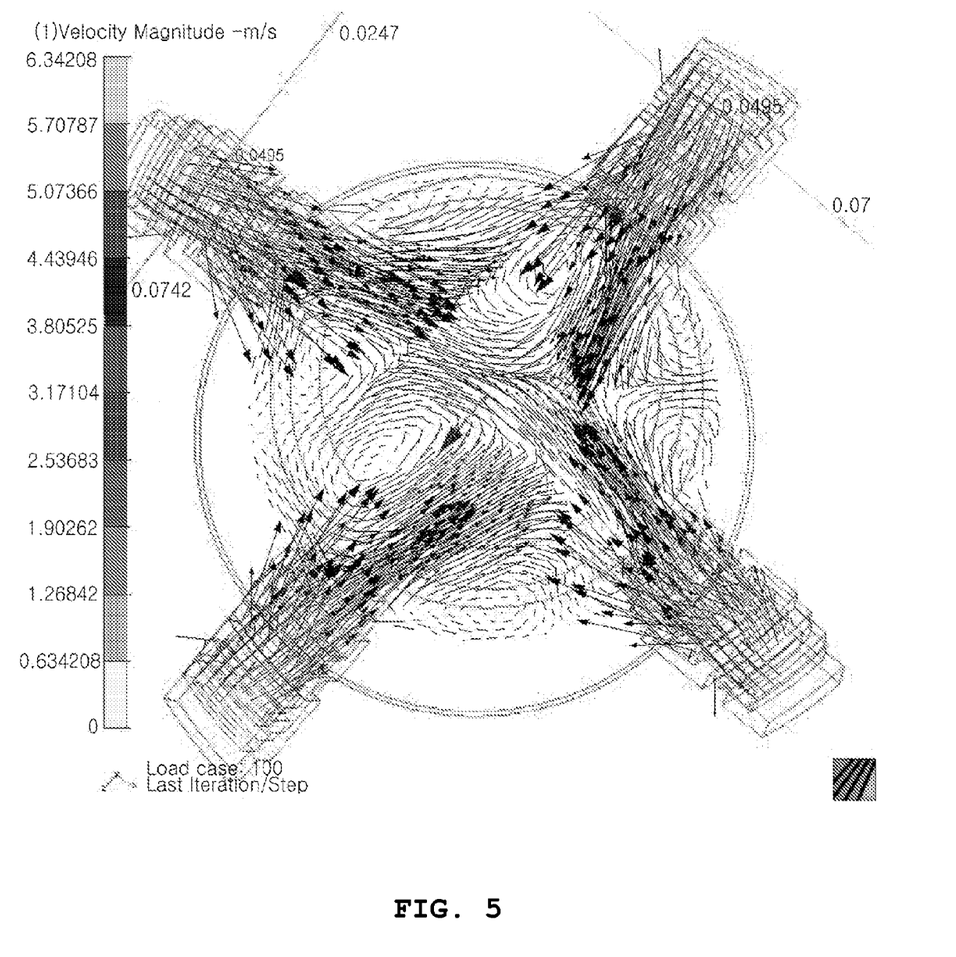
FIG. 5 is a fluid flow diagram showing fluid moving patterns within the fluid flow control device according to the first preferred embodiment.
Figure 6:
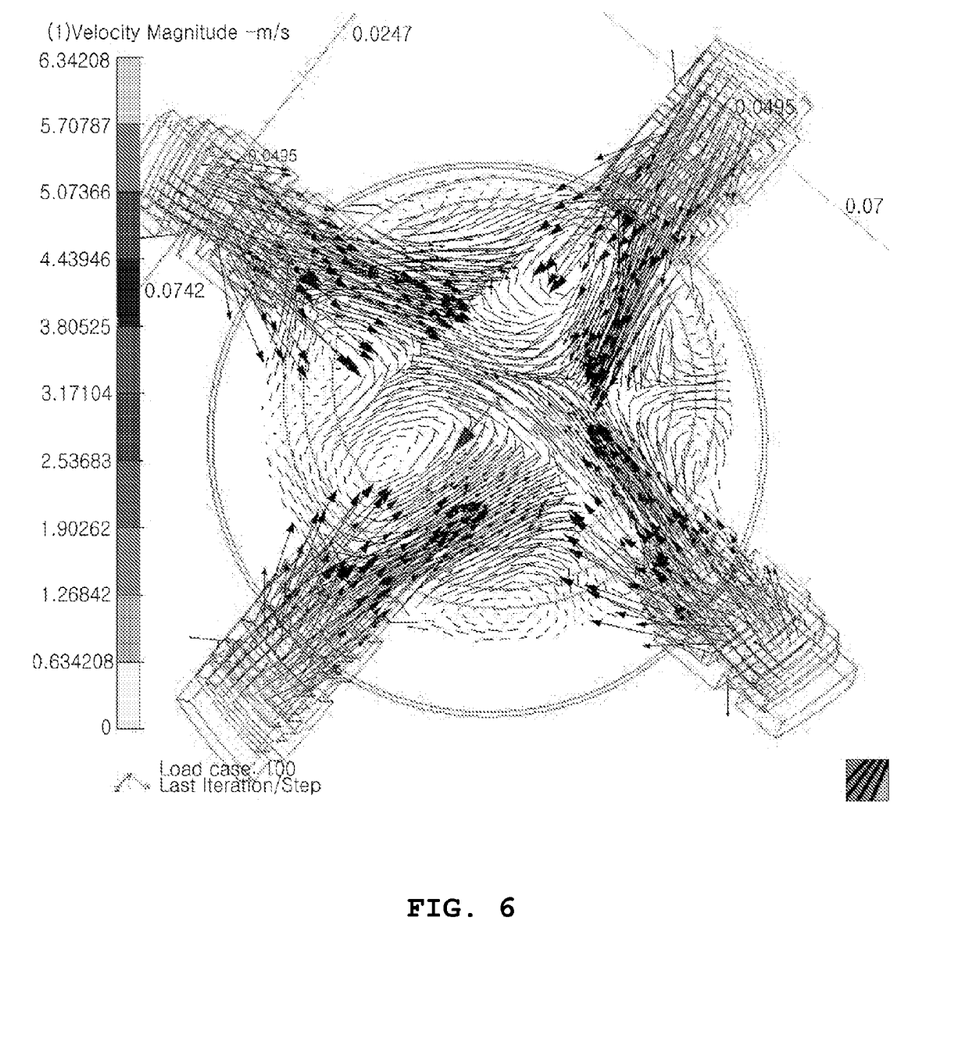
FIG. 6 is a fluid flow diagram showing fluid moving patterns within the fluid flow control device according to the prior art.

FIG. 5 is a fluid flow diagram showing fluid moving patterns within the fluid flow control device according to the preferred embodiment, and FIG. 6 is a fluid flow diagram showing fluid moving patterns within the fluid flow control device according to the prior art. The first cylinder 110 according to the first embodiment is in a cylindrical shape having an inner circumference corresponding to an outer circumference of the plug 40 within the fluid flow control device 100 illustrated in FIG. 1. The first cylinder 110 includes a first fluid pathway 111 of an elongated form providing a passageway for inflow and outflow of fluid and formed in such a way as to penetrate an outer circumferential surface of the first cylinder 110. In this instance, a plurality of the first fluid pathways 111 is disposed vertically and horizontally along the outer circumferential surface of the first cylinder 110. Five to ten first fluid pathways 111 are formed vertically and four to ten first fluid pathways 111 are formed horizontally. A side of a lower end of each upper fluid pathway 111 is overlapped with a side of an upper end of each lower fluid pathway 111 on the same line where ends of the fluid pathways vertically adjacent to each other are parallel to the ground. Because a great deal of flow rate is formed during a unit movement of the plug if the fluid pathways are formed elongated in right and left horizontal directions, the first fluid pathways 111 are inclined at an angle (a) of between approximately 20 degrees and approximately 40 degrees, preferably 30 degrees, from the ground in order to prevent the formation of great flow rate. As described above, because the first fluid pathways 111 of the elongated form are inclined at the predetermined angle, the flow rate is increased and decreased smoothly according to opening of the plug, namely, valve opening, through a consecutive connection and overlapping between the fluid pathways in relation with displacement of the plug to thereby prevent a gradual change of the flow rate relative to displacement of the valve opening.

Moreover, as shown in FIG. 3, since the fluid pathways 111 horizontally adjacent to each other are inclined in such a way as to symmetrically face each other, in case that the fluid flow is formed inwardly from the outside of the fluid flow control device 100, it prevents non-uniform pressure distribution inside the fluid flow control device 100. In Korean Patent No. 0527918 issued to the same inventor as the present invention, if all the fluid pathways are inclined in the same direction, as shown in FIG. 6, small eddies of fluid are generated inside the first cylinder 110 due to the inclined angle (a) of the first fluid pathways 111, and hence, a plurality of small whirling flow patterns are formed. The velocity of moving fluid increases locally according to the small whirling flow patterns, and pressure of the central portion is lower than surrounding pressure to thereby form non-uniform pressure, and hence, it may cause damages of the fluid flow control device 100 due to local cavitation, flashing, hammering, or the like.

Meanwhile, when the diagonal fluid pathways 111, 121 and 131 are formed to symmetrically face each other, as shown in FIG. 5, not a number of the small whirling flow patterns but one big whirling flow pattern is formed inside the whole fluid flow control device 100. Accordingly, as relatively uniform velocity and pressure of fluid are generated, there is no phenomenon to cause the damage of the fluid flow control device 100, such as cavitation, flashing, hammering, and so on.

Additionally, since the first fluid pathways 111 are inclined at the predetermined angle, inflow amounts of fluid at both ends are less than that of the central portion of the first fluid pathways 111. In order to prevent such a phenomenon, a side of the lower end of each upper fluid pathway 111 is overlapped with a side of the upper end of each lower fluid pathway 111 on the same line where ends of the fluid pathways vertically adjacent to each other are parallel to the ground. When the first fluid pathways 111 are formed as described above, in order to prevent a decrease of the flow rate of fluid at both ends of the first fluid pathways 111, having an elongated or a rectangular form, fluid simultaneously flows into the ends of the longitudinal first fluid pathways 111 adjacent to the above first fluid pathways 111, whereby the inflow rate of fluid can be kept uniformly.

The second cylinder 120 according to the first embodiment of the present invention is generally in a form similar to the first cylinder 110. The second cylinder 120 is in a cylinder form having an inner circumference with the same size as the outer circumference of the first cylinder 110 and has a thickness identical to the first cylinder 110. In this instance, the second cylinder 120 includes second fluid pathways 121 formed on an outer circumference thereof, which are located at positions corresponding to the first fluid pathways 111, based on the upper end or the lower end of the first fluid pathways 111 of the first cylinder 110. Each of the second fluid pathways 121 has the same horizontal width as each of the first fluid pathways 111 and is longitudinally higher than the first fluid pathways 111. The second fluid pathways 121 are twice higher than the first fluid pathways 111 and provide a flow path of fluid by communicating with the first fluid pathways 111 of the first cylinder 110. As described above, the second fluid pathways 121 of the second cylinder 120 are formed in the same pattern as those of the first cylinder 110 in all aspects, such as the inclination angle, form, and so on, excepting from the longitudinal height.

The third cylinder 130 according to the first embodiment of the present invention generally has the same pattern as the first cylinder 110. Furthermore, the third cylinder 130 has the same thickness as the first cylinder 110 and the second cylinder 120. In this instance, the third cylinder 130 includes third fluid pathways 131 constructed in such a way as to penetrate an outer circumference of the third cylinder 130 and to communicate with the second fluid pathways 121 of the second cylinder 120, but the third fluid pathways 131 are out of the first fluid pathways 111 of the first cylinder 110. That is, the entire path of fluid ranging from the first fluid pathways 111 of the first cylinder 110 to the third fluid pathways 131 of the third cylinder 130 is formed in such a way that the first fluid pathways 111 and the third fluid pathways 131 are respectively connected to upper portions and lower portions of the second fluid pathways 121 in a dislocated manner. Due to the above pattern, the flow path is bent twice within a range from the first fluid pathways 111 to the third fluid pathways 131 through the second fluid pathways 121, such that a single unit turning pathway pattern is constructed.

Figure 4:
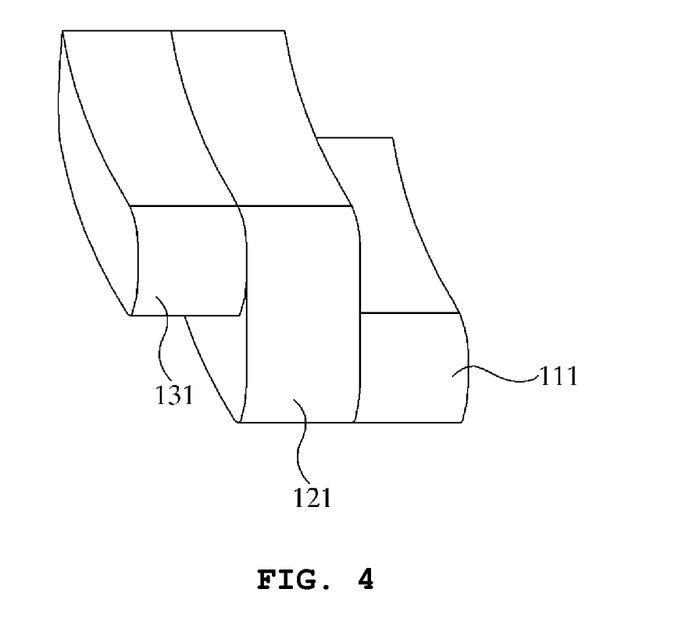
FIG. 4 is a perspective view of a unit turning flow path according to the first preferred embodiment.

FIG. 4 is a perspective view of the unit turning flow path according to the first embodiment. As described above, the first cylinder 110, the second cylinder 120 and the third cylinder 130 are combined with one another, such that the single unit turning flow path is formed as shown in FIG. 4. Such a turning flow path may be formed in one or in plural number according to usages of the fluid flow control device 100. If a plurality of the unit turning flow paths are needed, an A-type cylinder having first fluid pathways 111 identical to those of the first cylinder 110, a B-type cylinder having second fluid pathways 121 identical to those of the second cylinder 120, and a C-type cylinder having third fluid pathways 131 identical to those of the third cylinder 130 are repeatedly formed in order of the A-type cylinder, the B-type cylinder, the C-type cylinder, the B-type cylinder and the A-type cylinder, so that a wanted unit turning flow path can be formed. The fluid flow control device 100 according to the first embodiment illustrated in FIGS. 2 and 3 consists of the first to seventh cylinders 110 to 170 on which the A-type, B-type, C-type, B-type, A-type, B-type and C-type cylinders are overlapped.

Figure 7:
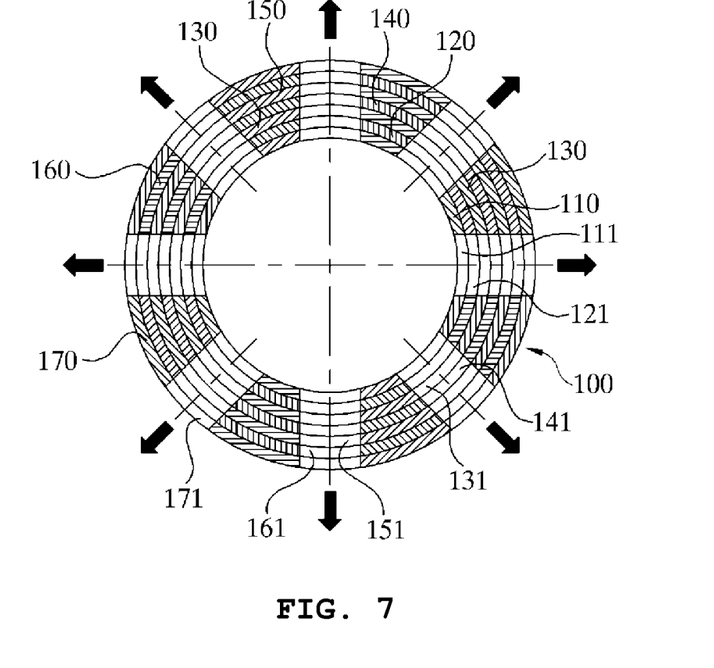
FIG. 7 is a cross-sectional view of the cylinder according to the first preferred embodiment.
Figure 8:
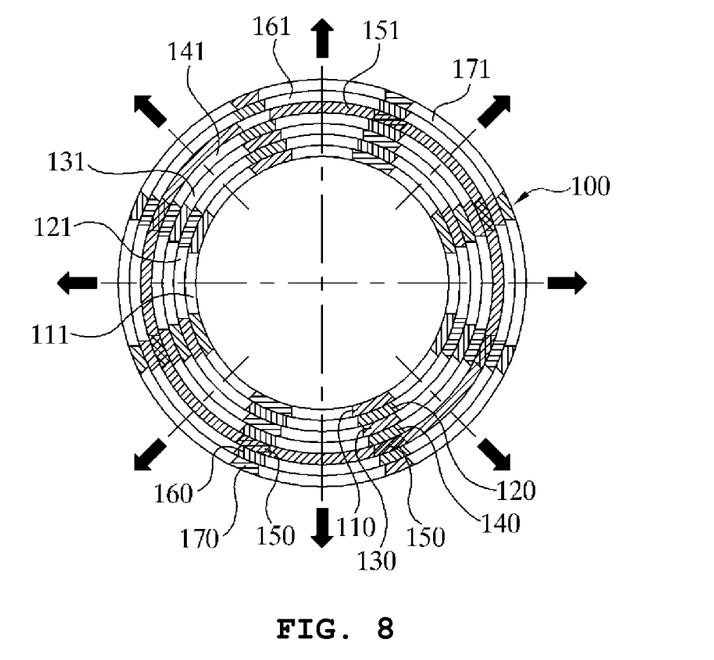
FIG. 8 is a cross-sectional view of a cylinder according to a modification example of the first preferred embodiment.

FIG. 7 is a cross-sectional view of the cylinder according to the first embodiment of the present invention, and FIG. 8 is a cross-sectional view of a cylinder according to a modification example of the first embodiment. The first fluid pathways 111 to the seventh fluid pathways 171 respectively formed in the first cylinder 110 to the seventh cylinder 170 can be used in a modified manner as shown in FIG. 7 or 8 according to kinds of fluid. In case that fluid is an incompressible fluid like liquid, as shown in FIG. 7, the fluid pathways 111 to 171 of the cylinders 110 to 170 all have the same width. Moreover, in case that fluid is a compressible fluid like gas, in order to effectively achieve flowing conditions, such as pressure, velocity, and so on, by accepting volume expansion due to a gaseous diffusion and a pressure decrease, as shown in FIG. 8, the fluid pathways 111 to 171 are formed in such a way that the widths of the fluid pathways 111 to 171 gradually increase from the inside to the outside.

The first to seventh cylinders 110 to 170 can be respectively fixed by means of pins in such a way that they are arranged properly and can be combined with each other through welding or brazing.

In the drawings, unexplained reference numerals 140 to 170 designate the fourth to seventh cylinders, 141 to 171 designate the fourth to seventh fluid pathways. Hereinafter, for convenience in explanation, description will be made mainly for the first to third cylinders 110 to 130.

Embodiment 2

Figure 9:
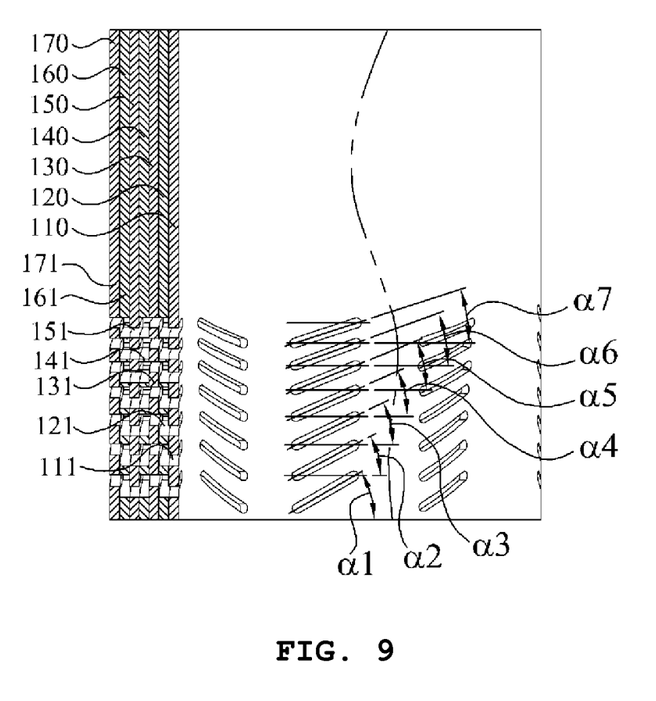
FIG. 9 is a partially sectional view of a fluid flow control device according to a second preferred embodiment of the present invention.
Figure 10:
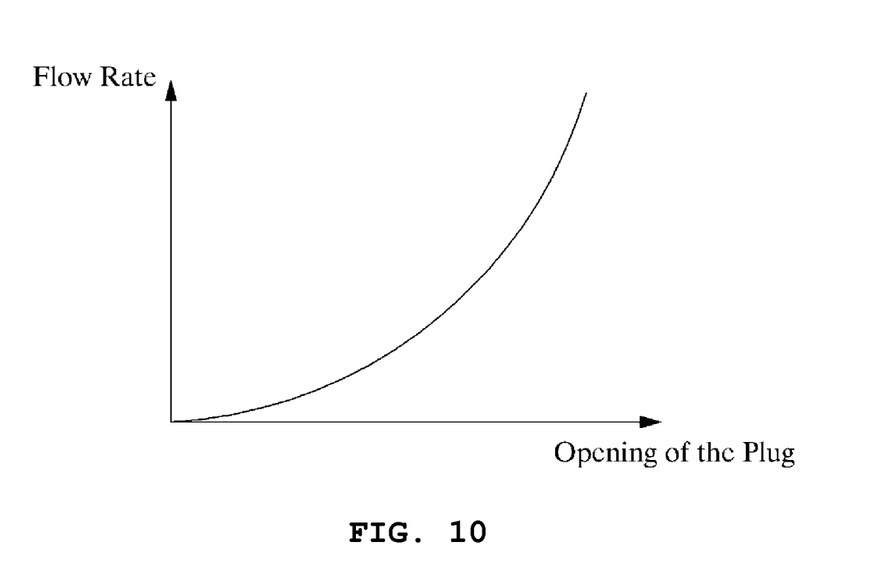
FIG. 10 is a graph showing a flow rate according to opening of a plug of the fluid flow control device according to the second preferred embodiment of the present invention.

FIG. 9 is a partially sectional view of a fluid flow control device according to a second embodiment of the present invention, and FIG. 10 is a graph showing a flow rate according to opening of a plug of the fluid flow control device according to the second embodiment. As shown in FIG. 9, the fluid flow control device 100 according to the second embodiment of the present invention is generally similar to the first embodiment. As shown in FIG. 10, for a case that a gradual increase of flow rate according to the opening of the plug 40 is needed, the fluid flow control device 100 is constructed in such a way that inclination angles of the first to third fluid pathways 111 to 131 of the first to third cylinders 110 to 130 are decreased from the lower portion toward the upper portion. In other words, in case that seven longitudinal fluid pathways are formed, angles made between the seven fluid pathways and the ground are respectively designated as a1, a2, a3, a4, a5, a6 and a7 starting from the fluid pathway formed on the lower portion of the fluid flow control device 100. The inclination angles are regulated to be gradually decreased in order of a1, a2, a3, a4, a5, a6 and a7, namely, a1>a2>a3>a4>a5>a6>a7. In FIG. 10, the horizontal axis indicates the opening of the plug 40, and the vertical axis indicates the flow rate.

As shown in FIG. 9, when the inclination angles of the first to third fluid pathways 111 to 131 are decreased upwardly from the lower portion, the area of the fluid pathways gradually opened as the plug 40 moves upwardly is widened. In other words, the flow rate increases as shown in FIG. 10 because the flow rate gradually increases with the increase of opening of the plug 40.

Embodiment 3

Figure 11:
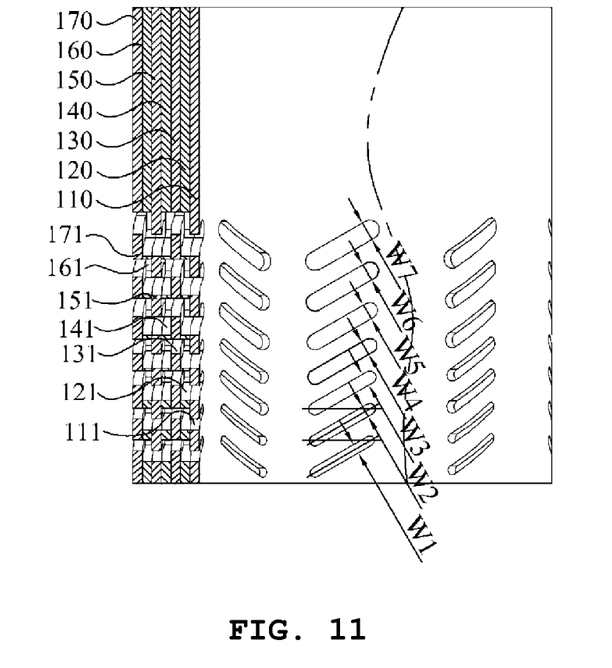
FIG. 11 is a partially sectional view of a fluid flow control device according to a third preferred embodiment of the present invention.

FIG. 11 is a partially sectional view of a fluid flow control device according to a third embodiment of the present invention. As shown in FIG. 11, the fluid flow control device 100 according to the third embodiment of the present invention is generally similar to the first preferred embodiment. For a case that a gradual increase of flow rate according to the opening of the plug 40 as described in the second embodiment is needed, the longitudinal fluid pathways out of the first to third fluid pathways 111 to 131 of the first to third cylinders 110 to 130 are gradually higher upwardly from the lower portion. As shown in FIG. 11, heights of the seven longitudinal fluid pathways are indicated as W1 to W7, and the flow path is formed in such a way that the heights of the fluid pathways are increased in order of W1, W2, W3, W4, W5, W6 and W7, namely, $W<W2<W3<W4<W5<W6<W7$. Also in the above case, a graph for the flow rate relative to the opening identical to the graph of FIG. 10 can be obtained.

Embodiment 4

Figure 12:
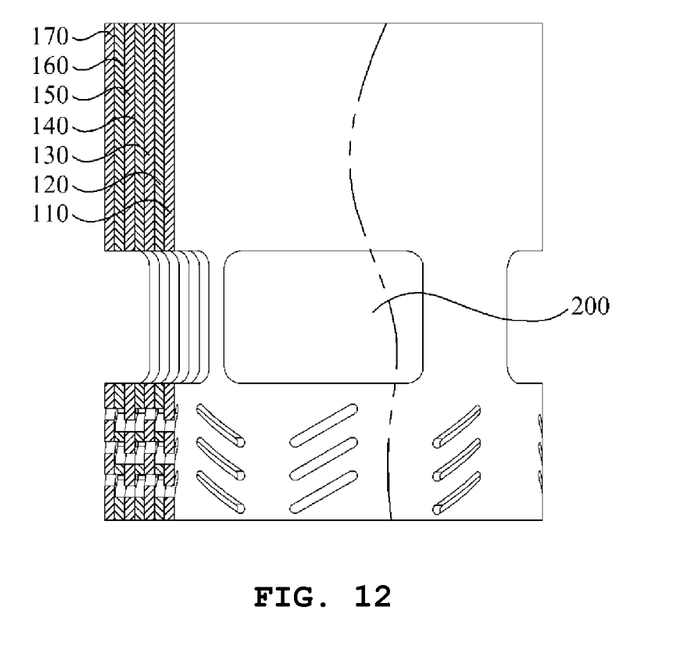
FIG. 12 is a partially sectional view showing an example of a fluid flow control device according to a fourth preferred embodiment of the present invention.

FIG. 12 is a partially sectional view of an alternative form of a fluid flow control device according to a fourth preferred embodiment of the present invention. The fluid flow control device 100 according to the fourth preferred embodiment includes first to third fluid pathways 111 to 131, which are identical to those of the fluid flow control devices 100 of the first to third preferred embodiments, formed at a part of the lower portion of the fluid flow control device 100. Moreover, the fluid flow control device 100 according to the fourth preferred embodiment further includes window-shaped through holes 200 of the same size, which are formed on all of the cylinders 110 to 170. That is, as shown in FIG. 12, a flow path formed at a side of the lower portion of the fluid flow control device consists of fluid pathways respectively formed in the first to seventh cylinders 110 to 170, on which the A-type, B-type, C-type, A-type, B-type and C-type cylinders are overlapped, and the through holes 200 of the same size are respectively formed in approximately central portions of the first to seventh cylinders 110 to 170. In such a fluid flow control device 100, three to five first fluid pathways 1111, three to five second fluid pathways 121, and three to five third fluid pathways 131 are longitudinally mounted in consecutive order in order to prevent that the inside of the fluid flow control device 100 is damaged due to highly differential pressure and fast flow in the beginning that the plug 40 is opened, and a large amount of fluid can be formed at a side of the central portion thereof.

Figure 13:
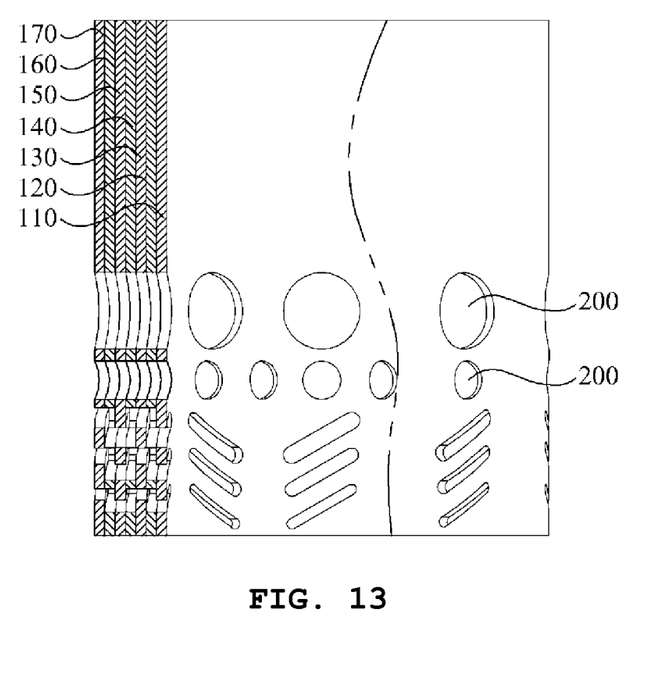
FIG. 13 is a partially sectional view showing another example of a fluid flow control device according to the fourth preferred embodiment of the present invention.

FIG. 13 is a partially sectional view of another alternative form of a fluid flow control device according to the fourth preferred embodiment of the present invention. As shown in FIG. 13, the modification example of the fluid flow control device 100 according to the fourth preferred embodiment has a structure generally similar to the fluid flow control device 100 of the fourth preferred embodiment. However, as the plug 40 moves upwardly, the area of the fluid pathways opened at the same position is gradually widened, and hence, the fluid flow control device 100 is capable of being designed to increase the inflow rate of fluid according to movement of the plug 40.

Embodiment 5

Figure 14:
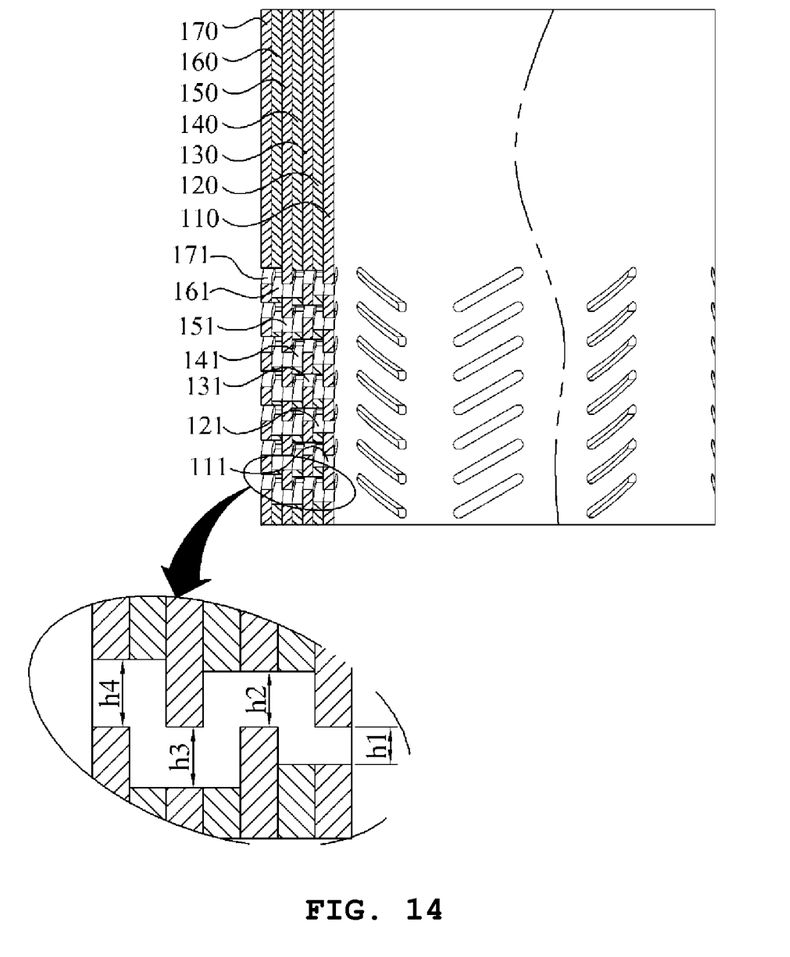
FIG. 14 is a partially sectional view of a fluid flow control device according to a fifth preferred embodiment of the present invention.

FIG. 14 is a partially sectional view of a fluid flow control device according to a fifth preferred embodiment of the present invention. The fluid flow control device 100 according to the fifth preferred embodiment is formed in such a way that cross-section areas of fluid pathways are gradually increased toward an advancing direction of fluid in order to effectively control flow rate and pressure according to the spread of fluid. The fluid flow control device 100 according to the present invention mainly uses vapor or gas since liquid does not have a big impact on volume changes. In case that gas is applied to the fluid flow control device, a path for introducing the fluid into the center of the cylinder and discharging it to the outskirts is mainly used. In other words, the path that gas is introduced through the outlet 20 illustrated in FIG. 1 and discharged through the inlet 10 is mainly used.

Forms of the first to seventh cylinders 110 to 170 according to the fifth preferred embodiment are similar to the cylinders according to the first to fourth preferred embodiments. However, the first, third, fifth and seventh fluid pathways of the A-type cylinder and the C-type cylinder are formed in such a way that longitudinal heights thereof are increased in consecutive order in order to accept the spread of gas. In other words, when the height of the fluid first fluid pathways 111 is indicated as h1, the height of the third fluid pathways 131 is h2, the height of the fifth fluid pathways 151 is h3, and the height of the seventh fluid pathways 171 is h4, the longitudinal heights of the fluid pathways of the cylinders are gradually increased from the central cylinder toward the outside cylinder, whereby h1<h2<h3<h4 is established. In this instance, the first to seventh cylinders 110 to 170 have the same thickness.

Embodiment 6

Figure 15:
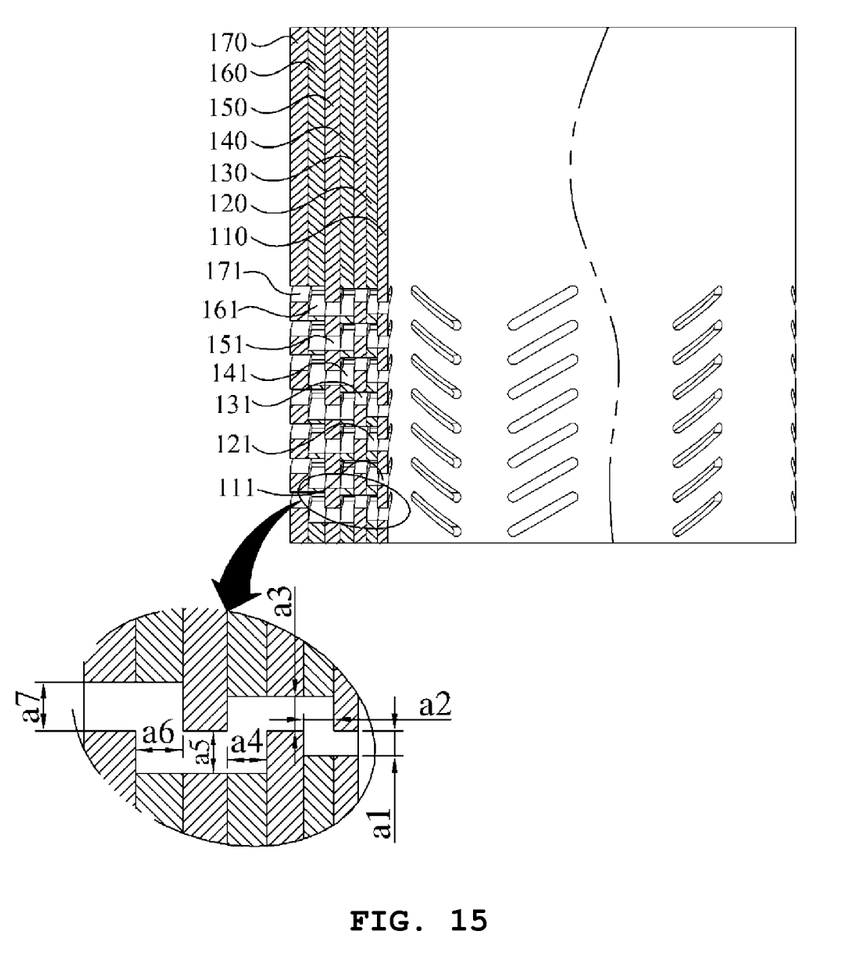
FIG. 15 is a partially sectional view of a fluid flow control device according to a sixth preferred embodiment of the present invention.

FIG. 15 is a partially sectional view of a fluid flow control device according to a sixth preferred embodiment of the present invention. As shown in FIG. 15, the fluid flow control device 100 according to the sixth preferred embodiment of the present invention is generally similar to that of the fifth preferred embodiment. However, in order to greatly decrease the flow rate and pressure according to the spread of the fluid, the thicknesses of the cylinders are gradually increased from the first cylinder 110, which is located at the central portion of the device, toward the seventh cylinder 170, which is located on the outskirts thereof.

For convenience in explanation, the height of the first fluid pathways 111 of the first cylinder 110 is indicated as a1, the thickness of the second cylinder 120 is a2, the height of the third fluid pathways 131 of the third cylinder 130 is a3, the thickness of the fourth cylinder 140 is a4, the height of the fifth fluid pathways 151 of the fifth cylinder 150 is a5, the thickness of the sixth cylinder 160 is a6, and the height of the seventh fluid pathways 171 of the seventh cylinder 170 is a7. Thus, in relation with a1 to a7, a1<a2<a3<a4<a5<a6<a7 can be obtained. That is, the heights of the fluid pathways of the odd number cylinders 110, 130, 150 and 170 and the thicknesses of the even number cylinders 120, 140 and 160 are gradually increased from the central cylinder toward the outside cylinder. Since the first to seventh cylinders 110 to 170 are formed as described above, the fluid flow control device according to the present invention can effectively decrease the flow rate and pressure of fluid by effectively accepting volume changes according to the spread of the fluid.

As described above, it is to be appreciated to those skilled in the art that the present invention can be embodied in many different forms without departing from the scope and spirit of the present invention. Thus, it should be understood that the embodiments described herein are described as exemplifications and do not restrict the present invention to the specific forms. The scope of the present invention is not to be restricted by the embodiments but only by the appended claims. It should be understood that the present invention is meant to cover all modifications, similarities and alternatives which are included in the spirit and scope of the present invention.

What is claimed is:

1. A fluid flow control device having a cylinder assembly, which includes cylinders overlapped with each other and fluid pathways for controlling flow rate and velocity of fluid, the fluid flow control device comprising:
 a first cylinder having a plurality of first fluid pathways of an elongated form laterally permeating the cylinder from a central axis, the first fluid pathways being horizontally and longitudinally formed along an outer circumference of the cylinder, the elongated dimension of the first fluid pathways being inclined symmetrically to each other;
 a second cylinder disposed on the outer circumference of the first cylinder, the second cylinder having second fluid pathways formed in correspondence with the first fluid pathways and communicating with the first fluid pathways, the longitudinal width of the second fluid pathways being greater than that of the first fluid pathways; and
 a third cylinder disposed on an outer circumference of the second cylinder, the third cylinder having third fluid pathways formed in correspondence with the second fluid pathways, the third fluid pathways having the same size as the first fluid pathways and being formed in such a way as to be dislocated from the first fluid pathways.

2. The fluid flow control device according to claim 1, wherein the first to third fluid pathways are inclined at an angle of between approximately 20 degrees and approximately 40 degrees from a ground.

3. The fluid flow control device according to claim 1, wherein the longitudinally formed first to third fluid pathways are formed in such a way that a side of a lower end of each upper fluid pathway is overlapped with a side of an upper end of each lower fluid pathway on the same line where ends of the fluid pathways vertically adjacent to each other are parallel to a ground, such that a continuous flow rate is formed when opening of a plug inscribing with the fluid flow control device is changed.

4. The fluid flow control device according to claim 1, wherein the longitudinally formed first to third fluid pathways have inclination angles gradually decreasing upwardly from the lower portions thereof.

5. The fluid flow control device according to claim 1, wherein the longitudinally formed first to third fluid pathways have longitudinal heights gradually increasing upwardly from the lower portions thereof.

6. The fluid flow control device according to claim 1, wherein the first to third fluid pathways are respectively formed in the lower portions of the first to third cylinders and window-shaped through holes are formed in approximately central portions of the first to third cylinders in such a way as to penetrate the first to third cylinders.

7. The fluid flow control device according to claim 6, wherein the through holes are formed in plural number, and the diameter of the plural through holes is gradually increased upwardly from the lower portions thereof.

8. The fluid flow control device according to claim 1, wherein the third fluid pathways are relatively higher than the first fluid pathways.

9. The fluid flow control device according to claim 1, wherein the height of the first fluid pathways, the thickness of the second cylinder and the height of the third fluid pathways are increased in sequential order.

10. The fluid flow control device according to claim 1, wherein the first, second and third cylinders respectively having the same fluid pathways as the first, second and third cylinders are repeatedly and successively formed in order of the first cylinder the second cylinder, the third cylinder, the second cylinder and the first cylinder in such a way as to increase diameter thereof.

* * * * *